(12) United States Patent
Wilfert

(10) Patent No.: US 7,210,668 B2
(45) Date of Patent: May 1, 2007

(54) VALVE ASSEMBLY HAVING A PRESSURE BALANCED SEGMENT SEAL

(75) Inventor: Russell D. Wilfert, Chandler, AZ (US)

(73) Assignee: Honeywell International, Inc., Morristown, NJ (US)

(*) Notice: Subject to any disclaimer, the term of this patent is extended or adjusted under 35 U.S.C. 154(b) by 470 days.

(21) Appl. No.: 10/668,819

(22) Filed: Sep. 22, 2003

(65) Prior Publication Data
US 2005/0062006 A1 Mar. 24, 2005

(51) Int. Cl.
F16K 25/00 (2006.01)

(52) U.S. Cl. .................................... 251/174

(58) Field of Classification Search .............. 251/172, 251/174, 175
See application file for complete search history.

(56) References Cited

U.S. PATENT DOCUMENTS

| | | | | |
|---|---|---|---|---|
| 2,391,278 A | * | 12/1945 | Stark | 251/175 |
| 2,506,097 A | * | 5/1950 | Melichar | 251/175 X |
| 3,479,006 A | * | 11/1969 | Brown | 251/174 |
| 3,647,181 A | | 3/1972 | Hulslander | 251/317 |
| 3,765,646 A | | 10/1973 | Hulslander et al. | 251/183 |
| 4,022,427 A | | 5/1977 | Read | 251/175 X |
| 4,385,747 A | | 5/1983 | Renaud, Jr. et al. | 251/175 X |
| 4,796,858 A | | 1/1989 | Kabel | 251/171 |
| 5,947,443 A | | 9/1999 | Shellenbarger et al. | 251/181 |
| 6,554,249 B2 | | 4/2003 | Pang et al. | 251/174 |
| 2002/0179876 A1 | | 12/2002 | Pang et al. | 251/174 |

OTHER PUBLICATIONS

"The American Heritage Dictionary", Second College Edition, Houghton Mifflin Co., p. 332.*

* cited by examiner

Primary Examiner—Robert M. Fetsuga
(74) Attorney, Agent, or Firm—Ingrassia Fisher & Lorenz (57) ABSTRACT

A plug valve assembly includes a plug and a segment seal assembly. The segment seal assembly is configured to reduce the differential pressure load across the segment seal assembly when the valve is closed. The segment seal includes an opening in fluid communication with a sealed vent region that is formed between the segment seal and the plug.

20 Claims, 6 Drawing Sheets

VALVE ASSEMBLY HAVING A PRESSURE BALANCED SEGMENT SEAL

STATEMENT REGARDING FEDERALLY SPONSORED RESEARCH OR DEVELOPMENT

This invention was made with Government support under contract number N00019-02-C-3002, awarded by the U.S. Navy. The Government has certain rights in this invention.

FIELD OF THE INVENTION

The present invention relates to plug valves and, more particularly, to a plug valve that includes a pressure balanced segment seal.

BACKGROUND OF THE INVENTION

Plug valves have been used, and continue to be used, in various industries. The plug valve is relatively simple in construction, and may be used to control the flow of fluid, both liquid and gas, through various parts of a system. Many conventional plug valves include a substantially cylindrical plug that is rotationally mounted within a valve body. The valve body includes inlet and outlet flow ports. The plug additionally includes a flow passage that may be selectively aligned with the valve body inlet and outlet ports, or positioned transverse to the valve body inlet and outlet ports. When the plug flow passages are aligned with the valve body inlet and outlet ports, the valve is open, and fluid flow through the valve is allowed. Conversely, when the plug flow passage is transverse to the valve body inlet and outlet ports, the valve is closed and fluid flow through the valve is prevented.

The plug may include a pocket into which a segment seal is installed. In many plug valves, this pocket is positioned on the plug such that the segment seal is pressure loaded against the valve body outlet port when the valve is closed. As a result, the segment seal may experience relatively large radial forces in the closed position. Thus, when the plug valve is subsequently moved to the open position, the plug and segment seal may experience relatively high frictional forces. These high frictional forces may result in the need to use a higher power valve actuator than might need to be otherwise used, which can result in increased valve and system costs. Moreover, the high frictional forces can damage the segment seal and/or plug.

Hence, there is a need for a plug valve that experiences lower frictional forces, as compared to presently known plug valves, when it is being moved from a closed position to an open position, and/or a plug valve that does not rely on relatively high power actuators, and/or reduces the likelihood of segment seal damage during operation, and/or reduces valve and system costs. The present invention addresses one or more of these needs.

SUMMARY OF THE INVENTION

The present invention provides a plug valve assembly that includes a segment seal assembly that is configured to reduce the differential pressure load across the segment seal assembly when the valve is closed. Thus, the frictional forces the segment seal assembly experiences when the plug valve assembly is moved between its closed and open positions are reduced. Thus, a relatively low power valve actuator may be used, and the likelihood of segment seal assembly damage during operation, is reduced.

In one embodiment, and by way of example only, a valve assembly includes a valve body, a plug, and a segment seal assembly. The valve body has at least a fluid inlet and a fluid outlet, at least one of which defines a cross sectional flow area. The plug is disposed within the valve body, and has at least an outer surface and a flow passage extending therethrough. The plug is selectively moveable between an open position, in which the flow passage is in fluid communication with the valve body fluid inlet and fluid outlet, and a closed position, in which the flow passage is not in fluid communication with the valve body fluid inlet and fluid outlet. The segment seal assembly is coupled to the plug and includes a main body, a seal gland, and a seal. The main body has a first side, a second side, and an opening extending therebetween, and is disposed proximate the plug outer surface. The seal gland is formed in the main body first side and surrounds the main body opening. The seal is disposed within the seal gland and is in contact with the plug outer surface, whereby a sealed vent region is formed between the main body first side and the plug outer surface. The sealed vent region has a cross sectional area that is substantially equal to or less than the defined cross sectional flow area.

In another exemplary embodiment, a valve for mounting within a valve body having an inlet, and an outlet, and wherein at least one of the valve body inlet and outlet define a cross sectional flow area, includes a plug, and a segment seal. The plug is adapted to be mounted within the valve body, and has at least an outer surface and a flow passage extending therethrough. The plug is selectively moveable between an open position, in which the flow passage is in fluid communication with the valve body inlet and outlet, and a closed position, in which the flow passage is not in fluid communication with the valve body inlet and outlet. The segment seal is coupled to the plug and includes a main body, a seal gland, and a seal. The main body has a first side, a second side, and an opening extending therebetween, and the first side is disposed proximate the plug outer surface. The seal gland is formed in the segment seal first side and surrounds the segment seal opening. The seal is disposed within the seal gland and is in contact with the plug outer surface, whereby a sealed vent region is formed between the segment seal first side and the plug outer surface. The sealed vent region has a cross sectional area that is substantially equal to or less than the defined cross sectional flow area.

Other independent features and advantages of the preferred plug valve assembly will become apparent from the following detailed description, taken in conjunction with the accompanying drawings which illustrate, by way of example, the principles of the invention.

DETAILED DESCRIPTION OF A PREFERRED EMBODIMENT

Figure 1:
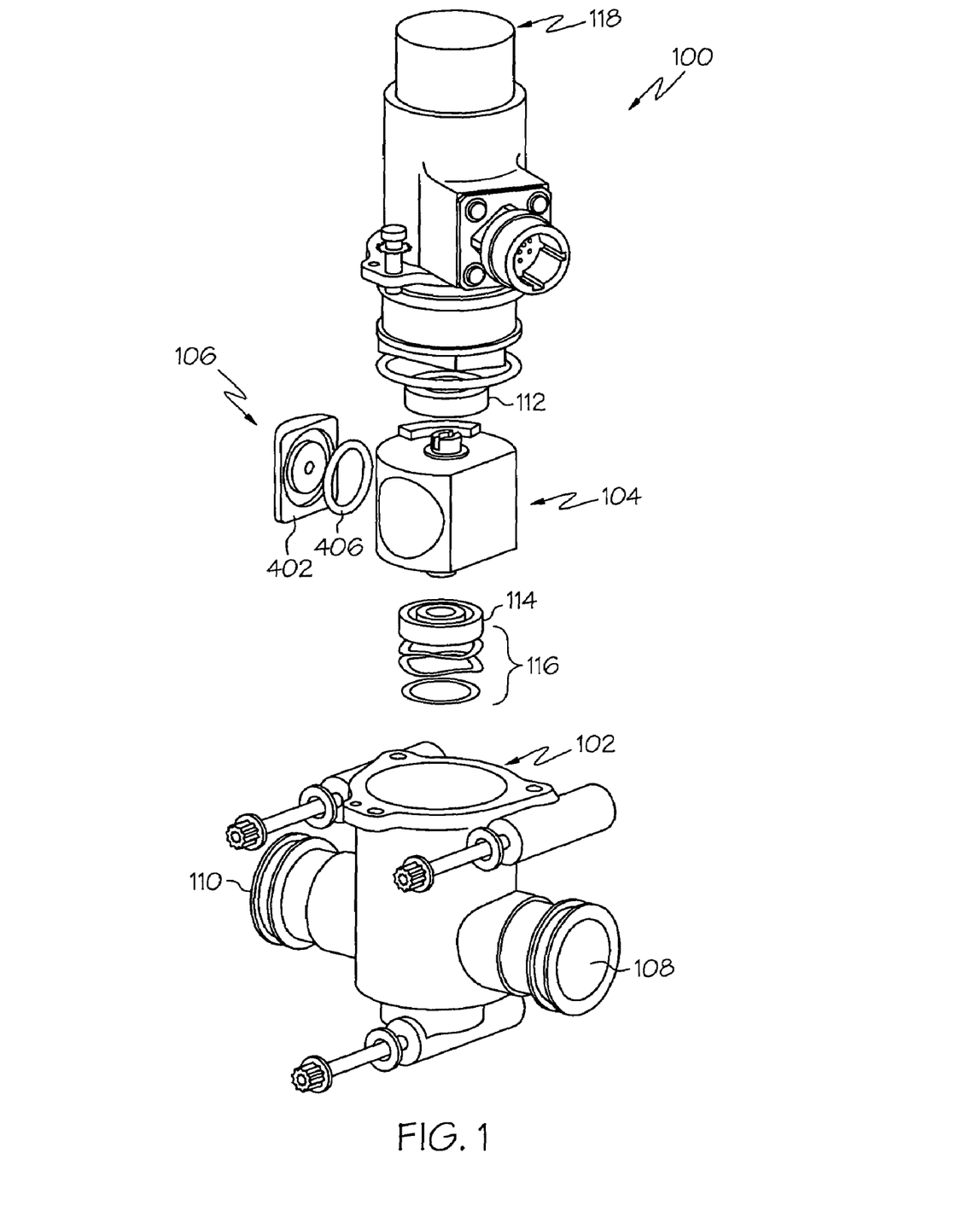
FIG. 1 is a perspective exploded view of a valve assembly according to an exemplary embodiment of the present invention.
Figure 2:
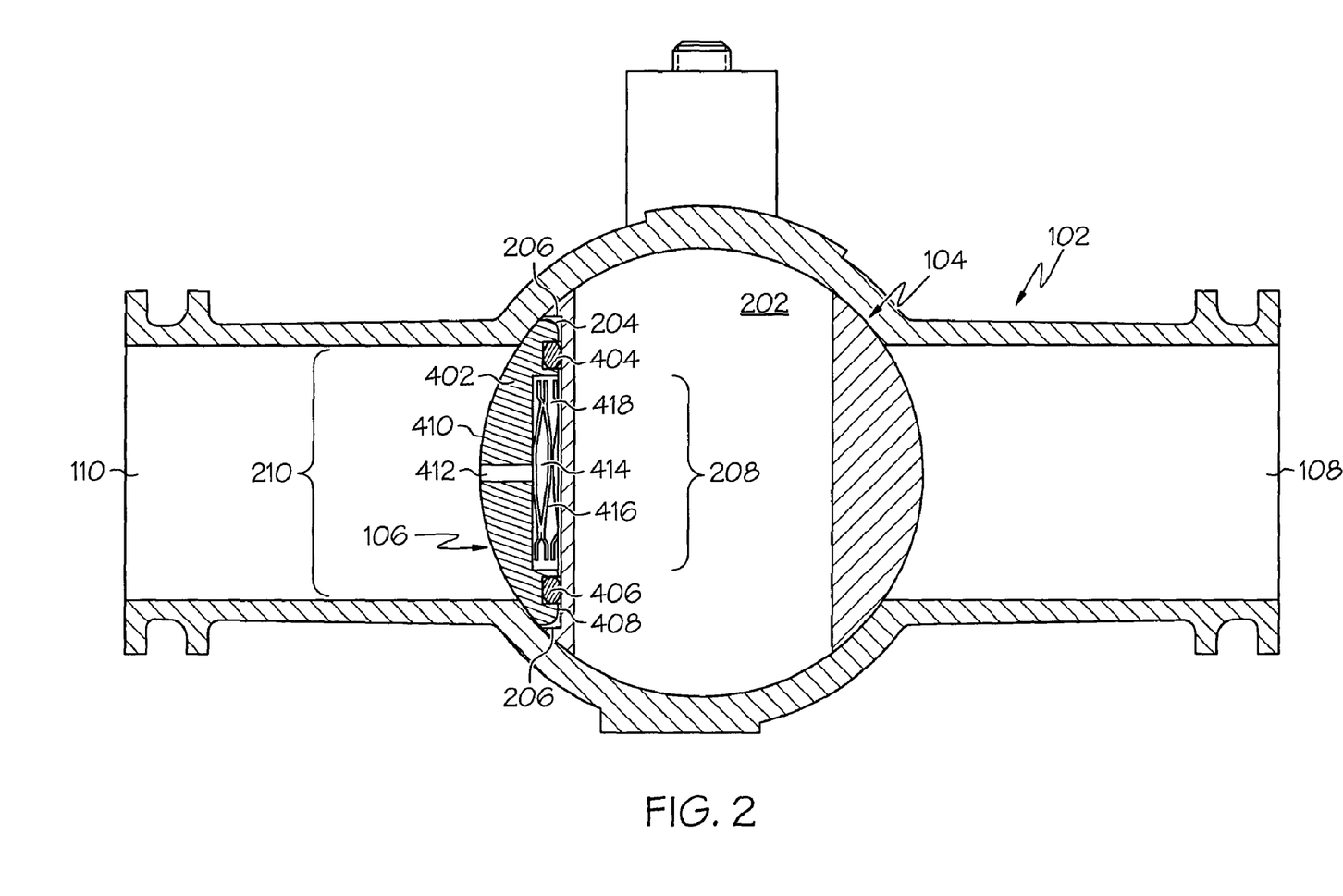
FIGS. 2 and 3 are cross section views of the assembled plug valve assembly shown in FIG. 1.
Figure 3:
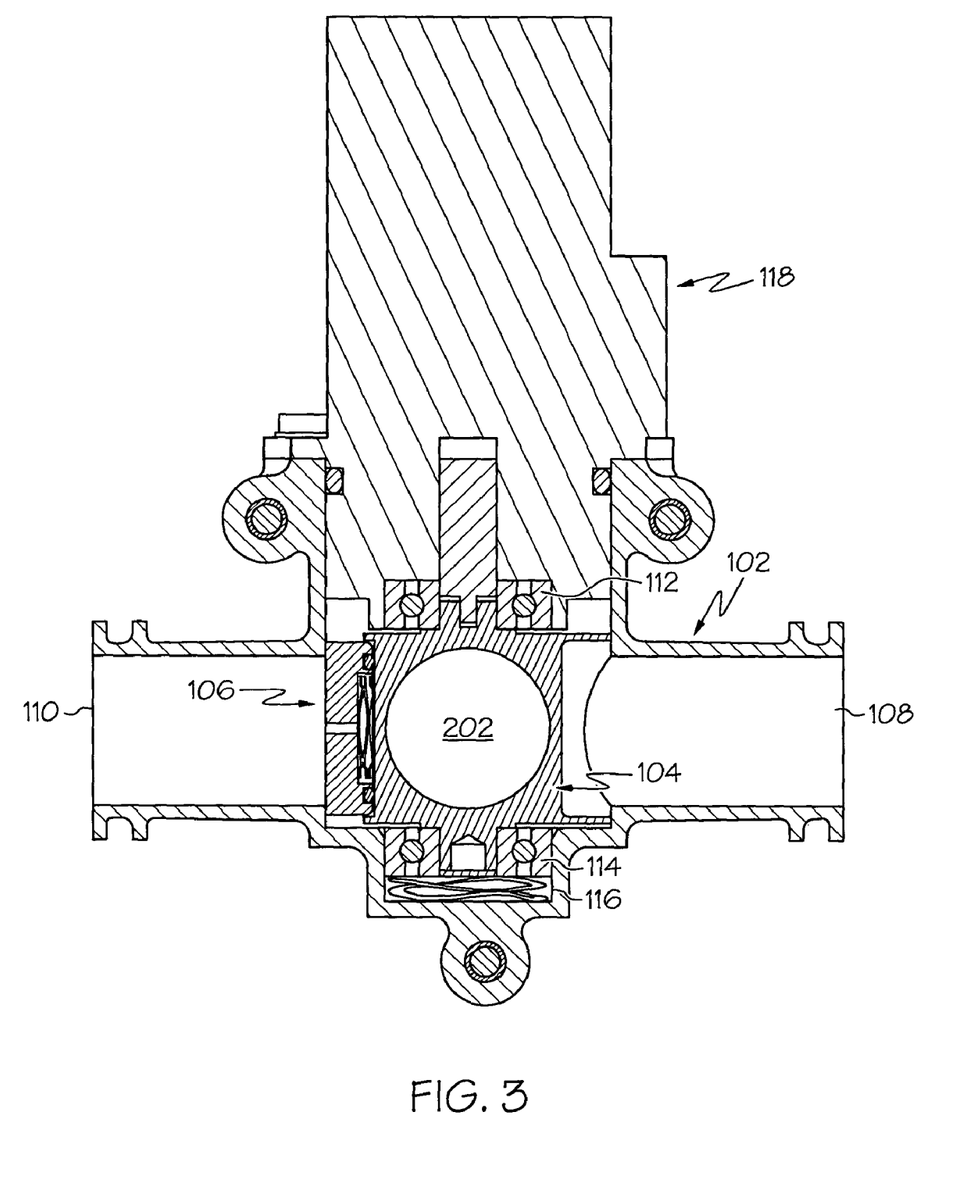

An exemplary embodiment of a plug valve assembly 100 is illustrated in perspective view in FIG. 1, and in two different cross section views in FIGS. 2 and 3, and is shown to include a valve body 102, a plug 104, and a segment seal assembly 106. The valve body 102 includes a fluid inlet 108 and a fluid outlet 110. The plug 104 is mounted within the valve body 102 between the fluid inlet 108 and fluid outlet 110. The plug 104, as shown most clearly in FIG. 2, is substantially cylindrical in cross section, and includes a flow passage 202 that extends through the plug 104.

The plug 104 is rotationally mounted within the valve body 102, and is moveable between a closed position and an open position. When the plug valve assembly is in the closed position, which is shown in FIG. 2, the plug flow passage 202 is not in fluid communication with the valve body fluid inlet 108 and outlet 110. Thus, fluid flow through the valve assembly 100 is inhibited. Conversely, when the plug is moved to the open position, the plug flow passage 202 is in fluid communication with the valve body fluid inlet 108 and the valve body fluid outlet 110. Thus, fluid may flow through the valve assembly 100.

The plug 104 may be rotationally mounted in the valve body 102 using any one of numerous types of hardware and hardware configurations. In the depicted embodiment, however, the plug 104 is rotationally mounted using two bearing assemblies, an upper bearing assembly 112, and a lower bearing assembly 114. The lower bearing assembly 112, as shown in FIGS. 1 and 3, is preferably biased upwardly by a spring 116. This upward bias is provided to inhibit axial movement of the plug 104 and to load the upper 112 and lower 114 bearing assemblies. It will be appreciated that the valve assembly 100 could be implemented without the spring 116.

The valve assembly 100 could be configured to be controlled manually, automatically, or both. However, in the depicted embodiment, the valve assembly 100 is configured to be controlled automatically. In this regard, the valve assembly 100 additionally includes an actuator assembly 118. The valve actuator assembly 118 is mounted to the valve body 102, and is coupled to the plug 104. The valve actuator 118, which may be any one of numerous known actuator assembly configurations, responds to valve command signals it receives from an external source (not shown), and rotates the plug 104 between the open and closed positions.

Figure 7:
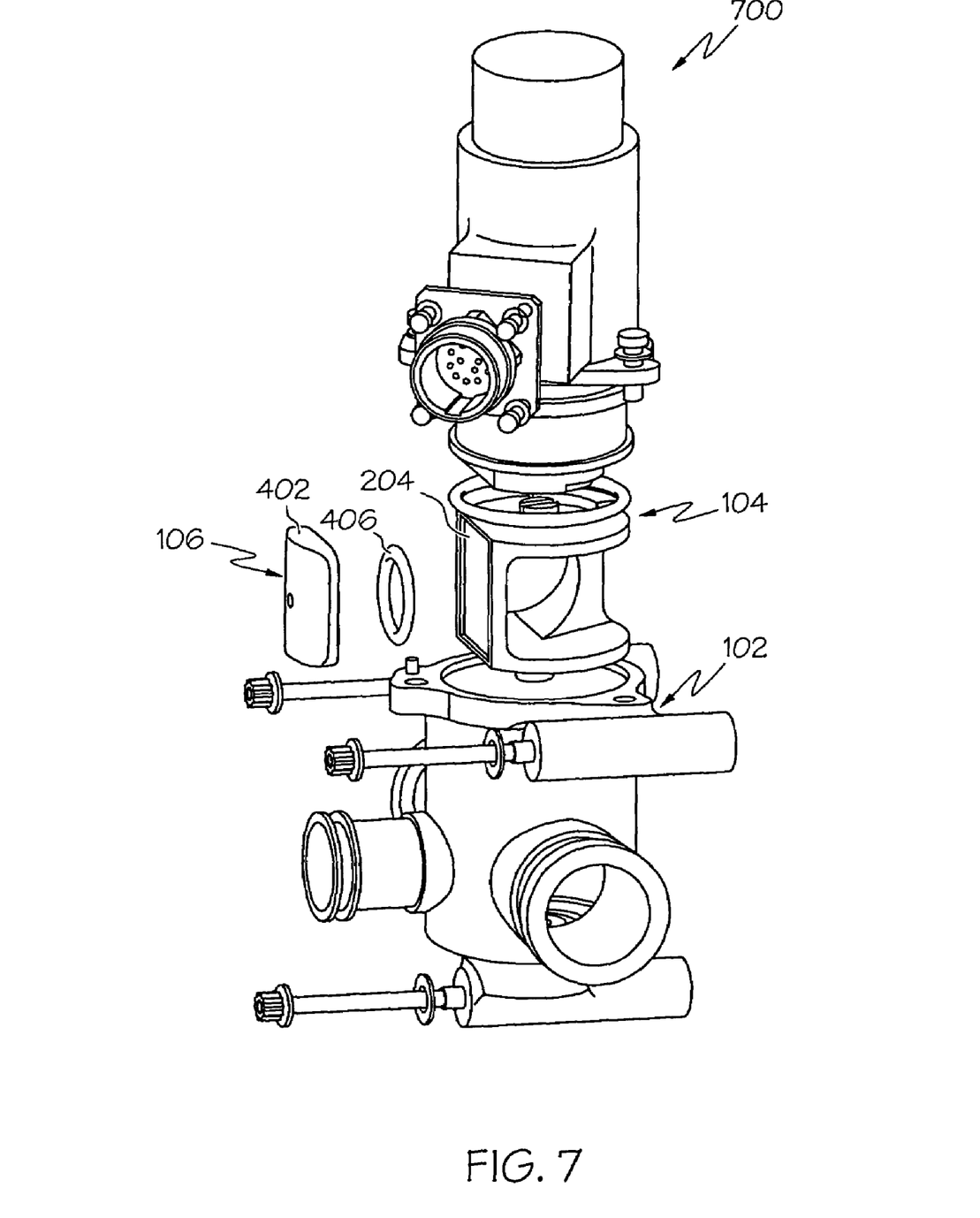
FIG. 7 is a perspective exploded view of a plug valve assembly according to an exemplary alternative embodiment of the present invention.

A recess 204, which may be seen most clearly in FIGS. 2 and 7, is formed inthe plug 104. The recess 204 includes a plurality of engagement sections 206 that extend substantially perpendicularly away from an inner surface 208 of the recess 204. The segment seal assembly 106 is at least partially disposed within the recess 204 and is kid within the recess 204 by the engagement sections 206. Thus, the segment seal assembly 106, which will now be described, rotates with the plug 104.

Figure 4:
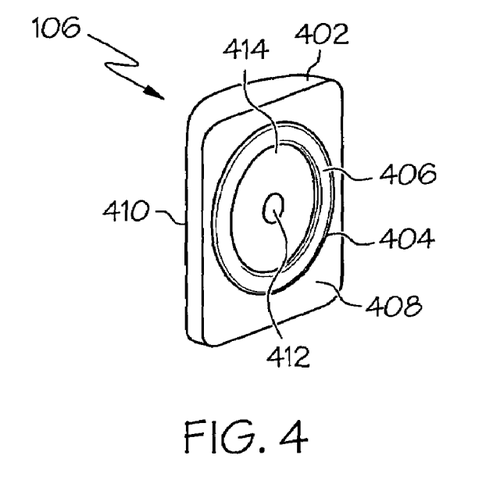
FIG. 4 is a perspective view of a segment seal assembly that may be used with the valve assembly shown in FIGS. 1–3.

The segment seal assembly 106, which is shown in perspective view apart from the plug 104 in FIG. 4, includes a main body 402, a seal gland 404, and a seal 406. The main body 402 includes a front side 408, a back side 410, and an opening 412 that extends between these two sides. In the depicted embodiment, a cavity 414 is formed in the main body front side 408. A spring element 416 is shown disposed in the cavity 414, which biases the segment seal assembly 106 toward the fluid outlet 110 when the valve assembly 100 is in the closed position. The spring element 416 could be any one of numerous spring elements including, for example, a crest-on-crest wave spring, a wave washer, a Belleville washer, or a helical compression spring. As will be discussed below, the segment seal assembly 106, in some embodiments, could be implemented without the spring element 416. It will additionally be appreciated that the segment seal assembly could be implemented without the cavity 414. Indeed, in the preferred embodiment, neither the spring element 416 nor the cavity 414 are included, to reduce manufacturing costs.

The seal gland 404 is formed in the main body front side 408, and surrounds the opening 412. The seal gland 404 additionally surrounds the cavity 414, in those embodiments in which the cavity 414 is included. The seal 406 is disposed within the seal gland 404. Thus, when the segment seal assembly 106 is coupled to the plug 104, a sealed vent region 418 is formed between the main body front side 408 and the plug 104. This sealed vent region 418 is in fluid communication with the main body opening 412. As shown most clearly in FIG. 2, the seal gland 404 and seal 406 are sized and dimensioned such that the sealed vent region 418 has a cross sectional area 208 that is equal to or less than the cross sectional flow area 210 of the valve body outlet 110. Preferably, the cross sectional area of the vent region 418 is only slightly less than the cross sectional flow area of the valve body outlet 110. By configuring the segment seal assembly 106 so that the vent region cross sectional area is less than the valve body outlet cross sectional flow area, a slight net force will exist when the valve assembly 100 is in the closed position, which will push the segment seal assembly 106 toward the valve body outlet 110.

Figure 5:
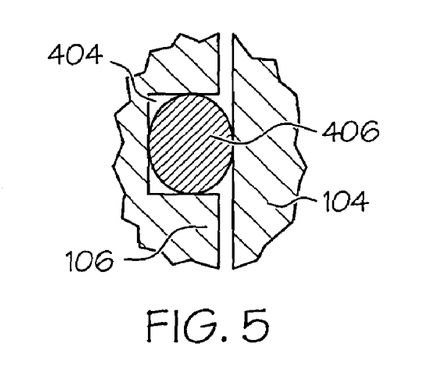
FIG. 5 is a close-up cross section view of a portion of the assembled plug valve assembly shown in FIG. 1.
Figure 6:
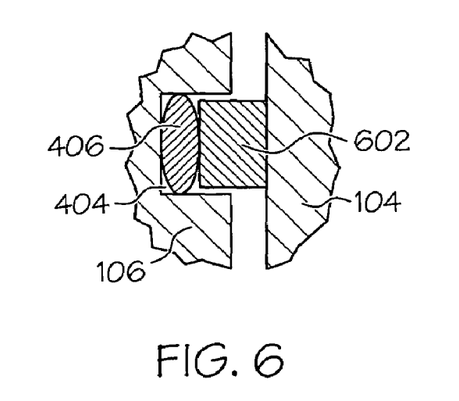
FIG. 6 is a close-up cross section view of a portion of the assembled plug valve assembly similar to that shown in FIG. 5, but according to an exemplary alternative embodiment.

In addition to being formed with an appropriate circumferential dimension, the seal gland 404 if further formed to have an appropriate depth. In particular, and as shown most clearly in FIG. 5, the depth of the seal gland 404 is dimensioned so that when the seal 406 is disposed within the seal gland 404, the seal 406 will be sufficiently compressed over a wide range of fluid pressures. In particular, the seal gland depth is dimensioned such that the seal 406 will be sufficiently compressed, to thereby adequately seal the vent region 418, even when fluid supply pressure is low. This will ensure that leakage around the seal 406 and into the vent region 418 will not occur at low fluid pressures. This also allows, at least in some embodiments, the segment seal assembly 106 to be configured and installed without the spring element 416. In yet another alternative configuration, a close-up view of which is shown in FIG. 6, a back-up ring 602 may be disposed within the seal gland 404 along with the seal 406, to prevent the seal 406 from extruding from the seal gland 404 when the valve assembly 100 is used in relatively high pressure applications. It will be appreciated that the seal 406 may be any one of numerous types of seals, and is not limited to the O-ring type seal that is depicted in the drawings.

The segment seal assembly main body 402 may be formed of any one of numerous known materials that provide good wear and sealing characteristics when disposed in the valve body 102, which is typically constructed of a metal. Such materials include, but are not limited to, plastics, such as polyimide, teflon, and peek, elastomers, such as silicone, fluorosilicone, and fluorocarbon, and metals, such as aluminum, and bronze. In a preferred embodiment, the main body 402 is formed of aluminum. In addition to appropriate material, it will be further appreciated that the segment seal main body 402 is formed such that those surfaces that contact the valve body 102 have fairly smooth finishes.

Figure 8:
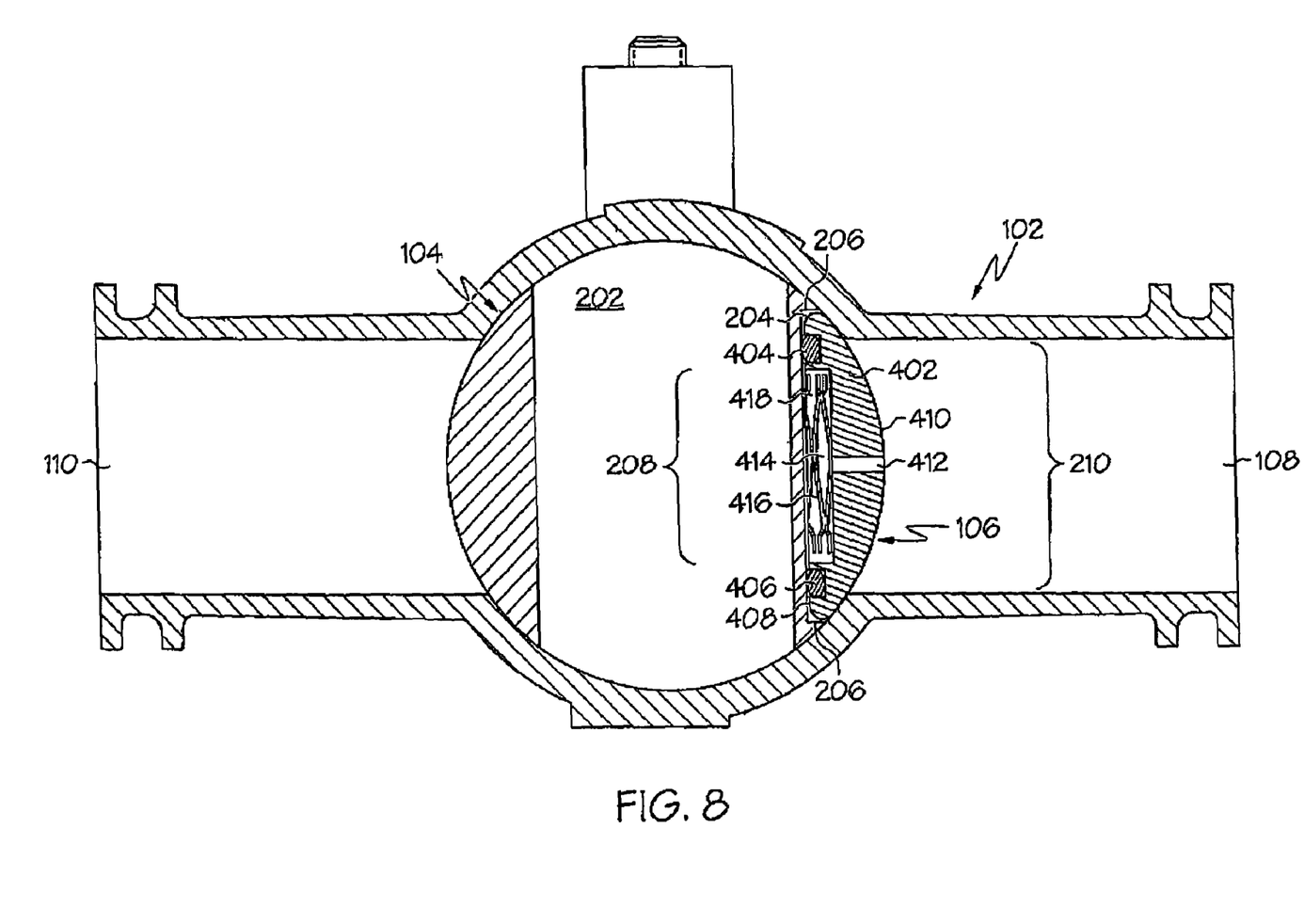
FIG. 8 is a cross section view of another exemplary embodiment of the assembled plug valve assembly.

The plug valve assembly 100 depicted in FIGS. 1–6 and described above, is implemented as a two port valve. However, it will be appreciated that the plug valve assembly 100 could be configured with more than this number of ports. For example, an exploded perspective view of a three port valve assembly 700 is illustrated in FIG. 7. Moreover, in the above description and included illustrations, the plug 104 and segment seal assembly 106 are configured such that the segment seal assembly 106 is disposed adjacent to the valve body outlet 110 when the valve assembly is in the closed position. However, it will be appreciated that the plug 104 and segment seal assembly 106 could be configured such that the segment seal assembly 106 is disposed adjacent to the valve body inlet 108 when the valve assembly is in the closed position. Such an alternate embodiment is shown in FIG. 8.

The plug valve assembly 100 and segment seal assembly 106 configuration described above reduces the differential pressure load across the segment seal assembly 106, which reduces the frictional forces the segment seal assembly experiences when the plug valve assembly is moved between its closed and open positions. As a result, the actuator assembly 118 that is used to control valve movement can be a relatively low-power actuator, as compared to those presently used on plug valve assemblies 100. The configuration of the segment seal assembly 106 also reduces the likelihood of segment seal assembly damage during operation, which can result in valve and system cost reductions.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A valve assembly, comprising:
a valve body having at least a fluid inlet and a fluid outlet, at least one of the valve body fluid inlet and fluid outlet defining a cross sectional flow area;
a plug disposed within the valve body, the plug having a least an outer surface and a flow passage extending therethrough, the plug selectively moveable between (i) an open position, in which the flow passage is in fluid communication with the valve body fluid inlet and fluid outlet, and (ii) a closed position, in which the flow passage is not in fluid communication with the valve body fluid inlet and fluid outlet; and
a segment seal assembly coupled to the plug, the segment seal assembly including:
a main body having a first side, a second side, and an opening extending therebetween, the segment seal first side disposed proximate the plug outer surface, a seal gland formed in the main body first side and surrounding the main body opening, a seal disposed within the seal gland and in contact with the plug outer surface, whereby a sealed vent region is formed between the main body first side and the plug outer surface,
wherein the sealed vent region has a cross sectional area that is less than the defined cross sectional flow area.

2. The valve assembly of claim 1, further comprising:
a backup ring disposed at least partially within the seal gland along with the seal.

3. The valve assembly of claim 1, further comprising:
an actuator assembly mounted on the valve body and coupled to the plug, the actuator adapted to receive one or more control signals and operable, in response thereto, to move the plug between the open and closed positions.

4. The valve assembly of claim 1, further comprising:
one or more bearing assemblies mounted within the valve body and coupled tote plug, to thereby rotationally mount the plug therein.

5. The valve assembly of claim 1, further comprising:
a plurality of engagement sections extending substantially perpendicularly away from the plug outer surface, each engagement section engaging a portion of the segment seal main body.

6. The valve assembly of claim 5, wherein:
the engagement sections form a recess; and
at least a portion of the segment seal main body is disposed within the recess.

7. The valve assembly of claim 1, wherein the segment seal main body is biased away from the plug outer surface.

8. The valve assembly of claim 7 further comprising:
a spring disposed within at least a portion of the sealed vent region, the spring configured to bias the segment seal main body away from the plug outer surface.

9. The valve assembly of claim 1, wherein the segment seal main body opening is in fluid communication with the valve body inlet when the plug is in the closed position.

10. The valve assembly of claim 1, wherein the segment seal main body opening is in fluid communication with the valve body outlet when the plug is in the closed position.

11. A valve for mounting within a valve body having at least an inlet, and an outlet, and wherein at least one of the valve body inlet and outlet define a cross sectional flow area, the valve comprising:
a plug adapted to be mounted within the valve body, the valve plug having at least an outer surface and a flow passage extending therethrough, when mounted in the valve body, the plug is selectively moveable between (i) an open position, in which the flow passage in fluid communication with the valve body inlet and outlet, and (ii) a closed position, in which the flow passage will Dot be in fluid communication with the valve body inlet and outlet; and
a segment seal coupled to the plug, the segment seal including:
a main body having a first side, a second side, and an opening extending therebetween, the segment seal first side disposed proximate the plug outer surface, a seal gland formed in the segment seal first side and surrounding the segment seal opening, and
a seal disposed within the seal gland and in contact with the plug outer surface, whereby a sealed vent region is formed between the segment seal first side and the plug outer surface,
wherein the sealed vent region has a cross sectional area that is less than the defined cross sectional flow area.

12. The valve of claim 11, further comprising:
a backup ring disposed at least partially within the seal gland along with the seal.

13. The valve of claim 11, further comprising:
a plurality of engagement sections extending substantially perpendicularly away from the plug outer surface, each engagement section engaging a portion of the segment seal main body.

14. The valve of claim 13, wherein:
the engagement sections form a recess; and
at least a portion of the segment seal main body is disposed within the recess.

15. The valve of claim 11, wherein the segment seal main body is biased away from the plug outer surface.

16. The valve of claim 15, further comprising:
a spring disposed within at least a portion of the sealed vent region, the spring configured to bias the segment seal main body away from the plug outer surface.

17. A valve assembly, comprising:
a valve body having an inlet, and an outlet, at Least one of the valve body inlet and outlet defining a cross sectional flow area;
a plug disposed within the valve body, the plug having at least an outer surface and a flow passage extending therethrough, the plug selectively moveable between (i) an open position, in which the flow passage is in fluid communication with the valve body inlet and outlet, and (ii) a closed position, in which the flow passage is not in fluid communication with the valve body inlet and outlet;
one or more bearing assemblies mounted within the valve body and coupled to the plug, to thereby rotationally mount the plug therein;
an actuator assembly mounted on the valve body and coupled to the plug, the actuator adapted to receive one or more control signals and operable, in response thereto, to move the plug between the open and closed positions; and
a segment seal assembly coupled to the plug, the segment seal assembly including:
a main body having a first side, a second side, and an opening extending therebetween, the segment seal first side disposed proximate the plug outer surface, a seal gland formed in the main body first side and surrounding the main body opening,
a seal disposed within the seal gland and in contact with the plug outer surface, whereby a sealed vent region is formed between the main body first side and the plug outer surface,
wherein the sealed vent region has a cross sectional area that is less than the defined cross sectional flow area.

18. The valve assembly of claim 17, further comprising:
a spring disposed within at least a portion of the sealed vent region, the spring configured to bias the segment seal main body away from the plug outer surface.

19. The valve assembly of claim 17 further comprising:
a plurality of engagement sections extending substantially perpendicularly away from the plug outer surface, each engagement section engaging a portion of the segment seal main body.

20. The valve assembly of claim 12, wherein:
the engagement sections form a recess; and
at least a portion of the segment seal main body is disposed within the recess.

* * * * *

UNITED STATES PATENT AND TRADEMARK OFFICE
CERTIFICATE OF CORRECTION

PATENT NO. : 7,210,668 B2  Page 1 of 1
APPLICATION NO. : 10/668819
DATED : May 1, 2007
INVENTOR(S) : Russell D. Wilfert It is certified that error appears in the above-identified patent and that said Letters Patent is hereby corrected as shown below:

Column 6, line 18, "tote" should be changed to --to the--;
Column 6, line 53, "Dot" should be changed to --not--;
Column 7, line 20, "Least" should be changed to --least--.

Signed and Sealed this

Sixth Day of November, 2007

JON W. DUDAS
*Director of the United States Patent and Trademark Office*